July 3, 1962 F. P. SMITH 3,042,873

DELAY LINE CIRCUITRY FOR COLOR TELEVISION RECEIVERS

Filed Nov. 29, 1954 2 Sheets-Sheet 1

INVENTOR.
FRANK PATTERSON SMITH
BY
George A. Gust
ATTORNEY

DELAY LINE CIRCUITRY FOR COLOR TELEVISION RECEIVERS

Filed Nov. 29, 1954 2 Sheets-Sheet 2

INVENTOR.
FRANK PATTERSON SMITH
BY George A. Gust
ATTORNEY 3,042,873
Patented July 3, 1962

3,042,873

DELAY LINE CIRCUITRY FOR COLOR TELEVISION RECEIVERS

Frank Patterson Smith, Fort Wayne, Ind., assignor to International Telephone and Telegraph Corporation Filed Nov. 29, 1954, Ser. No. 471,618
3 Claims. (Cl. 329—192)

The present invention relates to delay line circuitry for color television receivers, and more particularly to delay line circuitry for delaying the usual luminance signals to coincide in time with the usual chrominance signals upon arrival at the picture tube.

In conventional color television receivers, at some point in the circuitry the luminance and chrominance signals are separated into two channels. The luminance signals, which correspond to the conventional monochrome signals, are amplified and thereafter coupled to suitable elements such as the control grids of a tri-gun picture tube. The chrominance signal is handled in such a manner as to derive therefrom three (3) suitable color signals which are coupled to the picture tube. The combination of the luminance and the color signals in the picture tube thereby serve in the reproduction of an image in substantially natural color.

The circuitry for handling the chrominance signals introduces a time delay which normally causes the luminance signals to arrive at the picture tube ahead of the color signal, whereupon it is necessary in conventional receivers to delay the arrival of the luminance signals so they will arrive in time coincidence with the color signals. The use of delay lines or delay circuitry in the luminance channel is conventional. This invention constitutes a decided improvement over the conventional arrangements in that the circuitry of the luminance channel is materially simplified and reduced in cost. As will be explained in the following, this invention leads to the elimination of one amplifying stage in the luminance channel.

A full explanation of the conventional color television standards and of symbols and terms are found in "Proceedings of the I.R.E." of January 1954.

Essentially, this invention comprehends the direct coupling of the second detector of the luminance channel to a delay line in such a manner that the detector circuitry constitutes essentially the proper terminating impedance for the line input. In prior art arrangements, a separate impedance in the form of a resistor was used as the input terminating impedance for the delay line, and the second detector was coupled thereto. This resistor is completely eliminated as well as an amplifying stage which was required to supply the losses introduced by this resistor.

It is an object of this invention to provide delay line circuitry for a color television receiver which is simple in construction, efficient in operation, and less costly than prior circuits.

It is another object of this invention to utilize the source impedance of the second detector of the luminance channel as the input terminating impedance for a delay line whereby the usual power losses may be avoided.

For a better understanding of the invention, together with other and further objects thereof, reference is made to the following description taken in connection with the accompanying drawings, the scope of the invention being defined by the appended claims.

Figure 1:
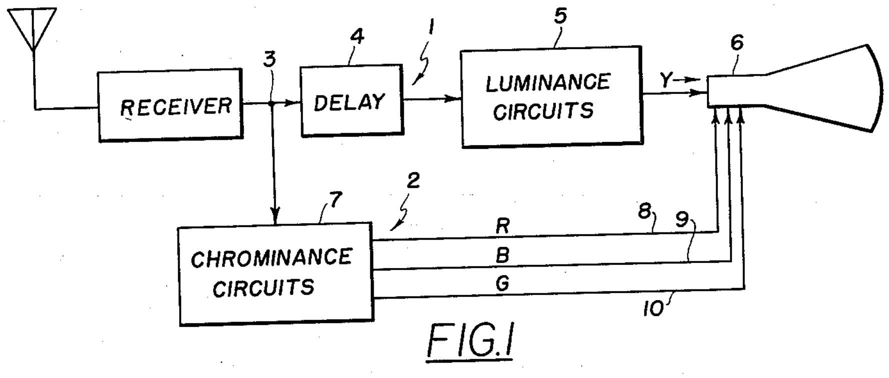
FIG. 1 is a block diagram of a conventional color television receiver showing the luminance and chrominance signal channels.
Figure 2:
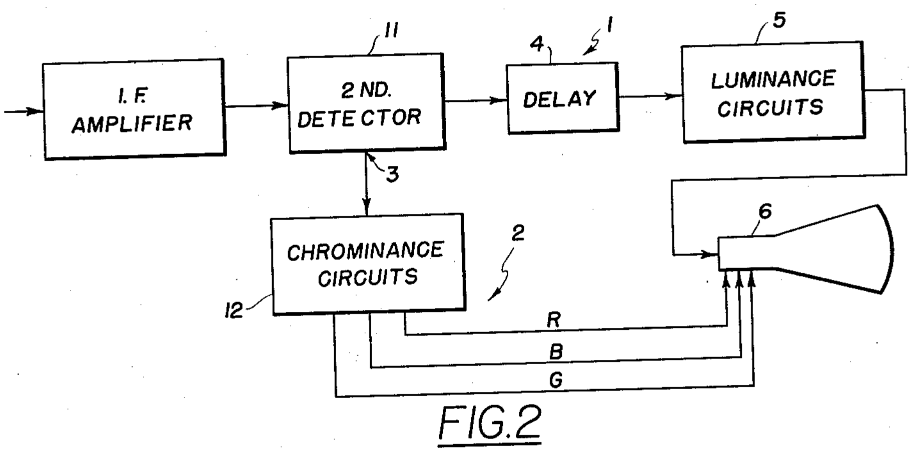
FIG. 2 is a detailed block diagram of a portion of the arrangement of FIG. 1.
Figure 3:
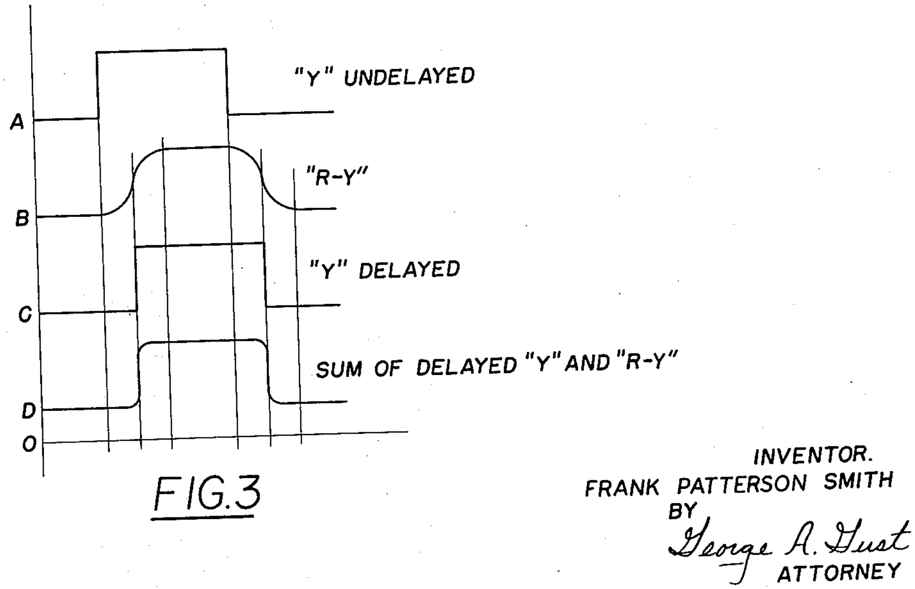
FIG. 3 is an illustration of wave forms used in explaining the operation of this invention.
Figure 5:
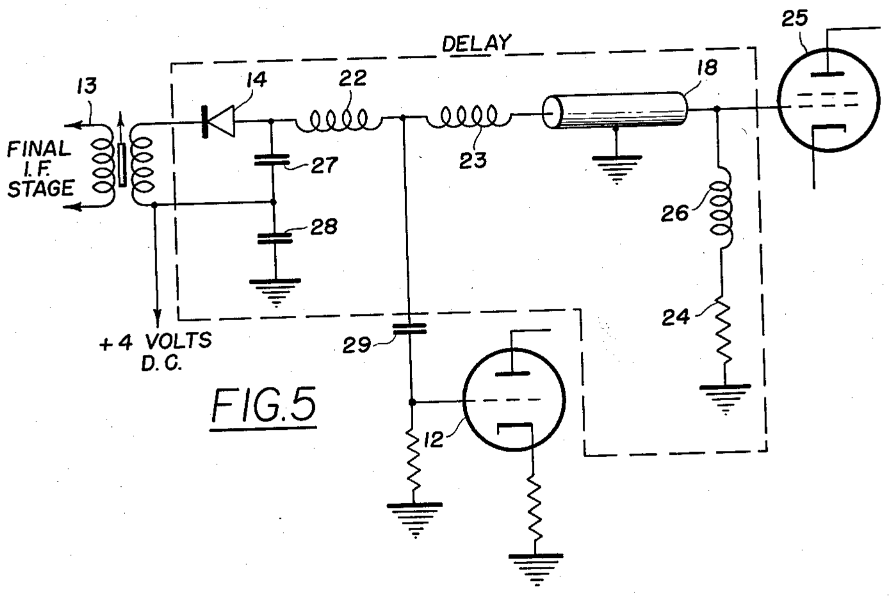
FIG. 5 is a circuit diagram of this invention.

Referring to the drawings, and more particularly to FIGS. 1, 2 and 3, the luminance and chrominance channels, indicated generally by the reference numerals 1 and 2, respectively, are shown to divide at a point 3, which may be located either before or after the second detector of the luminance channel. In FIG. 5, this point of separation is shown as following the second detector. The luminance or monochrome signals pass through a delay line 4 and are amplified by the usual amplifier 5 for application to the electron guns of the picture tube 6.

The chrominance signals are separated into individual chroma signal components by the usual circuits 7 and applied over three (3) separate coupling lines 8, 9 and 10 to the electron guns of the picture tube 6. In the illustrated embodiments, the separated chroma signals are indicated as being the components $(R-Y)$, $(B-Y)$ and $(G-Y)$. These chroma signals are matrixed in a conventional manner with the monochrome signal in the picture tube for deriving the true colors.

In FIG. 2 is shown in more detail the point at which the luminance and chrominance channels separate. This point of separation or pick-off is located in the stage of the second detector 11 of the luminance channel. The signal leaving the second detector 11 and coupled to the delay line 4 is seen in graph A of FIG. 3. One of the chrominance signals generated by the chrominance circuits 12 is shown in graph B. It occurs a period of time later than that of the signal A. Due to slower rise time in the chrominance circuits, the delay line 4 serves to delay the signal A as illustrated by graph C to occur in substantial time coincidence with the chroma signal B. These two signals B and C as shown arrive at the picture tube in time coincidence and are there combined in the form of graph D to provide the composite color signal which is utilized by the picture tube 6 for producing a color image. By use of the delay line, it is now understood that the chroma and monochrome signals are applied in proper phase or time relationship to the picture tube.

Figure 4:
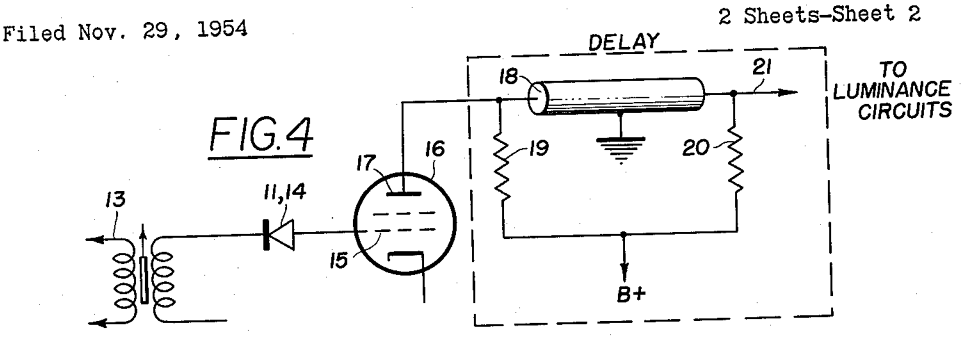
FIG. 4 is an illustration of prior art delay line circuitry.

In FIG. 4 is shown prior art delay line circuitry wherein the output circuit 13 of the intermediate frequency amplifiers is coupled to a diode detector 11, 14 which in turn is connected to the grid 15 of a conventional amplifier 16. The anode 17 of this amplifier is connected to a delay line 18 which is properly terminated at its input by a resistor 19. The output end of the delay line 18 is also properly terminated by resistor 20. The output line 21 is coupled directly to the luminance or monochrome amplifier in the usual manner.

The two resistors 19 and 20 are required to terminate the delay line 18. The impedance presented to the plate circuit of the amplifier 16 is therefore one-half (½) the value of one of these terminating resistors. This being true, fifty percent (50%) of the power applied to the delay line is lost in matching, and this loss in power is overcome by the use of an extra amplifier stage which in the present instance is the amplifier 16. It will be explained in the following how this stage 16 is completely eliminated as well as the terminating resistor 19.

Figure 6:
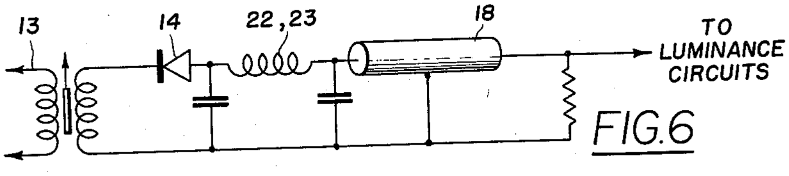
FIGS. 6 and 7 are equivalent circuit diagrams used in explaining the principles of this invention.
Figure 7:
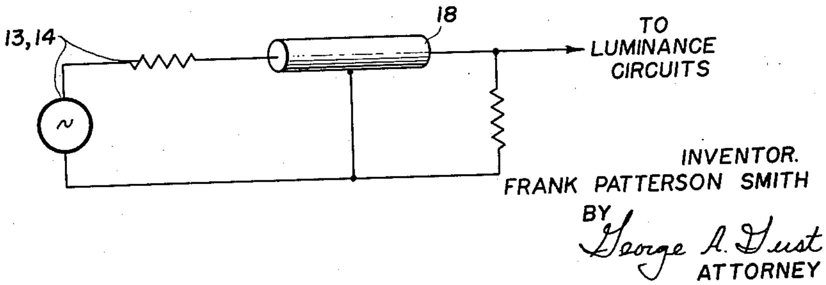

Referring to FIG. 5, like numerals will indicate like parts. The detector 14 is connected to the delay line through two suitable inductors or chokes 22 and 23. The terminating resistor 24 is connected to the output end of the delay line and matches substantially the impedance thereof. A single monochrome amplifier 25 is directly coupled to the output end of the delay line. The operation of this circuit in FIG. 5 is best understood by considering the equivalent circuit diagrams of FIGS. 6 and 7. In these equivalent circuits, it will be noted that the crystal source impedance is utilized to terminate the input end of the delay line 18. The usual crystal diode 14 has a value of impedance in the neighborhood of twenty-five hundred (2500) ohms, which impedance substantially matches that of the usual delay line 18. Since this is true, the source impedance of the detector 14 becomes the terminating impedance for the delay line such that it is no longer necessary to use the power consuming terminating resistor 19 of FIG. 4. Since the usual terminating resistor is entirely eliminated, the power consumed thereby is saved, whereupon it no longer becomes necessary to have a power amplifier, such as amplifier 16 of FIG. 4.

A complete stage of amplification is eliminated, as well as terminating resistor 19. There exists the possibility of eliminating direct current restoration, since direct coupling to the picture tube may be used.

In operation, since the crystal source impedance is utilized to terminate the delay line, essentially the same overall gain for a given band width of signals as that in monochrome receivers is achieved.

The delay line 18 of this invention is of conventional design and currently in use in color television receivers. A suitable delay line which operates quite satisfactorily has a nominal characteristic impedance of twenty-eight hundred (2800) ohms and a length to produce a delay in the order of eight-tenths (0.8) microseconds over a frequency range extending from zero to four (0 to 4) megacycles. The same or similar delay line is found in the model CXC10 television receiver of the Capehart-Farnsworth Company, and another appears in the publication entitled, "Electronics Magazine," dated February 1954 on page 138, under an article entitled "Design Techniques for Color Television Receivers." While it will be understood that the circuit specifications of the delay line circuitry of this invention will vary according to the design for any particular application, the following circuit specifications are included, by way of example only:

| | |
|---|---|
| Diode 14 | Detector 1N64. |
| Choke 22 | 93 microhenries. |
| Choke 23 | 50 microhenries. |
| Delay line 18 | 2800 ohms impedance, Columbia Technical HH2500. |
| Choke 26 | 75 microhenries. |
| Resistor 24 | 2700 ohms. |
| Condenser 27 | 5.6 micromicrofarads. |
| Condenser 28 | .0047 microfarads. |
| Condenser 29 | 180 micromicrofarads. |

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A luminance-signal circuit for a color television receiver comprising a circuit for delaying luminance signals a predetermined period of time including a signal delay line having input and output circuits, means terminating said output circuit with an impedance substantially equal to the impedance of said delay line, a video signal amplifier coupled to said output circuit, and a signal detector connected directly to said input circuit and having an impedance substantially matching the terminating impedance of said delay line, said detector being essentially the sole terminating impedance for said input circuit.

2. A luminance-signal circuit for a color television receiver comprising a circuit for delaying luminance signals a predetermined period of time including a signal delay line having input and output circuits, means terminating said output circuit with an impedance substantially equal to the impedance of said delay line, a video signal amplifier directly connected to said output circuit, and a diode detector directly connected to said input circuit and having an impedance substantially matching the terminating impedance of said delay line, said diode detector being essentially the sole terminating impedance for said input circuit.

3. A luminance-signal circuit for a color television receiver comprising a luminance signal channel which includes a source of signal voltage, a crystal detector coupled in series with said source, a signal delay line having input and output circuits for delaying a signal between said circuits in the order of 0.8 microseconds over a frequency range extending from 0 to 4 megacycles, said input circuit being directly connected to said source and said detector, the impedances of said crystal detector and source substantially matching the terminating impedance of said delay line and essentially being the sole terminating impedance for the input circuit thereof, an output matching impedance directly coupled to said output circuit for terminating the output circuit of said delay line, and a luminance signal amplifier coupled to said output circuit for amplifying the delayed signal derived from said line.

References Cited in the file of this patent

UNITED STATES PATENTS

| | | |
|---|---|---|
| 2,109,561 | Wright | Mar. 1, 1938 |
| 2,272,385 | Salzberg | Feb. 10, 1942 |
| 2,523,283 | Dickson | Sept. 26, 1950 |
| 2,677,806 | Chireix | May 4, 1954 |
| 2,679,585 | Drazy | May 25, 1954 |
| 2,691,727 | Lair | Oct. 12, 1954 |
| 2,811,580 | Avins | Oct. 29, 1957 |

OTHER REFERENCES

Electron Tube Circuits by Samuel Seely, pages 102–108. Published 1950, McGraw-Hill.

Notice of Adverse Decision in Interference

In Interference No. 93,238 involving Patent No. 3,042,873, F. P. Smith, DELAY LINE CIRCUITRY FOR COLOR TELEVISION RECEIVERS, final judgment adverse to the patentee was rendered Feb. 10, 1965, as to claims 1, 2 and 3.

[*Official Gazette March 30, 1965.*]